United States Patent [19]
Atwood

[11] 3,857,663
[45] Dec. 31, 1974

[54] MANDREL FOR ROUNDING DOUGH

[76] Inventor: Harold T. Atwood, 14152 Irving Ave., Dolton, Ill. 60619

[22] Filed: Mar. 20, 1974

[21] Appl. No.: 452,679

[52] U.S. Cl. ............ 425/308, 425/403, 425/364 B
[51] Int. Cl. ............................................ A21c 11/00
[58] Field of Search ........ 425/403, 364 B, 470, 296, 425/302, 308

[56] References Cited
UNITED STATES PATENTS

| | | | |
|---|---|---|---|
| 1,552,430 | 9/1925 | Gendler | 425/364 B |
| 2,628,578 | 2/1953 | Roth | 425/364 B X |
| 3,491,704 | 1/1970 | Thompson | 425/364 B X |

Primary Examiner—Francis S. Husar
Assistant Examiner—David S. Safran
Attorney, Agent, or Firm—Benjamin Schlosser

[57] ABSTRACT

A mandrel, adjustably mounted on a base and adapted to cooperate with a conveyor belt to form a strip of dough into a plurality of small rounded balls, is provided with a plurality of parallel fins projecting outwardly from the rear end portion of the mandrel along the lines of an elongated spiral extending in a generally longitudinal direction relative to the mandrel. The outer edges of the fins engage the inner surface of the conveyor belt that moves the dough longitudinally of the mandrel. The fins completely sever each strip of dough into a predetermined number of separate pieces as the dough is moved toward the rear end of the mandrel. The spiral arrangement of the fins causes each of the individual dough pieces to be rounded before they are discharged from the rear end of the mandrel.

2 Claims, 4 Drawing Figures

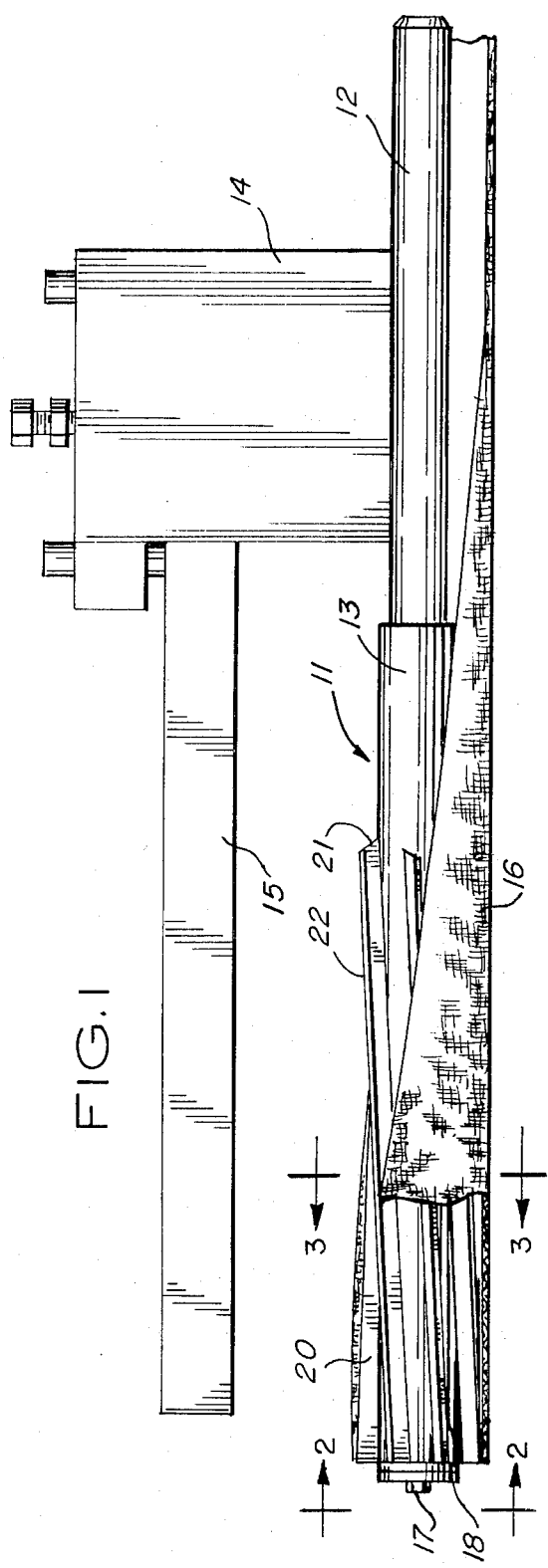
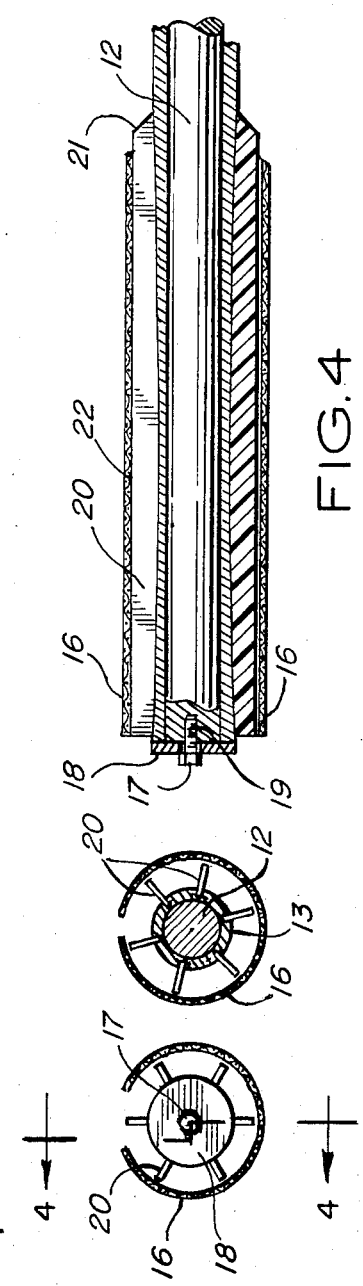

MANDREL FOR ROUNDING DOUGH

BACKGROUND OF THE INVENTION

1. Field of the Invention

The present invention is concerned with a mandrel capable of dividing a strip of dough into a plurality of small rounded balls that may be baked into minature rolls, or rolled into small circular sheets for pizzas, tacos, and similar foods. A plurality of individual balls may also be stuck together and then baked into Parker House rolls.

2. Description of the Prior Art

The only prior art, as far as applicant is aware, comprises bagel making machines as exemplified by the U.S. Pat. No. 3,407,754, issued Oct. 29, 1968, to Louis Wichinsky, in which a strip of dough is wrapped around a mandrel by a conveyor belt as it moves the dough lontitudinally of the mandrel.

SUMMARY OF THE INVENTION

The invention relates to a mandrel adapted to divide strips of dough into a plurality of small rounded balls of dough as each strip is moved longitudinally along the mandrel by a conveyor belt.

BRIEF DESCRIPTION OF THE DRAWINGS

FIG. 1 is an elevational view of a two-part mandrel secured to a support member;

FIG. 2 is an end elevational view of the rear end of the mandrel, as indicated by the line 2—2 of FIG. 1;

FIG. 3 is a cross sectional view, taken in the plane indicated by the line 3—3 of FIG. 1; and FIG. 4 is a longitudinal sectional view, taken in the plane indicated by the line 4—4 of FIG. 2.

DESCRIPTION OF THE PREFERRED EMBODIMENT

The mandrel 11 preferably comprises a solid cylindrical section 12 and a tubular section 13 adapted to slide axially on the rear end portion of the section 12. A flat plate 14 rigidly secured to the section 12 and extending longitudinally thereof is adjustably secured to a support member 15 in any suitable manner. The support member 15 may be an integral part of the frame of a bagel making machine, or may be rigidly secured thereto. The rear edge of the flat plate 14 terminates in a plane forwardly of the position at which a conveyor belt 16 substantially embraces the mandrel to guide the ends of each strip of dough into mutual juxtaposition as it moves the dough toward the rear end of the mandrel.

The mandrel may be formed as an integral unit, but the two part construction is preferred because it enables the tubular section 13 to be used with the solid mandrel section disclosed in my copending patent application for a MANDREL FOR SHAPING BAKERY PRODUCTS filed concurrently herewith.

The tubular section 13 is secured to the solid section 12 by a screw 17 that passes through a plate 18 covering one end of the section 13 and threads into a threaded opening 19 in the rear end of section 12. A plurality of fins 20 project outwardly from the rear end portion of the tubular section 13. The fins are parallel to each other and extend along an elongated spiral line in a direction generally longitudinal relative to the mandrel.

The conveyor belt 16 is curved longitudinally so as to embrace the cylindrical portion of the mandrel to form each strip of dough into a substantially torus shape as it moves the strip towards the fins. The front end 21 of each of the fins completely severs the dough to form a plurality of individual pieces as the dough is moved along the rear end portion of the mandrel. The outer edges 22 of the fins each engage the inner surface of the conveyor belt to keep the individual pieces of dough separate from each other as they are moved to the rear end of the mandrel. The spiral arrangement of the fins causes each separate piece of dough to impinge against one of the fins as the dough is moved longitudinally along the mandrel. The pressure of each piece of dough against the fin imparts a rotary motion to the dough so that each piece of dough is rounded into ball shape before it reaches the rear end of the mandrel from which it is discharged. The rounding action to which each piece of dough is subjected is governed by the length of the fins and their degree of angularity. With most commercial doughs, fins approximately 14 inches long having an angular deviation of about four degrees from the longitudinal axis of the mandrel will produce balls of suitable texture.

I claim:

1. A mandrel comprising a cylindrical section and a conveyor belt substantially embracing the rear end portion of said cylindrical section in predetermined spaced relationship to its outer circumferential surface, said cylindrical section having a plurality of fins projecting outwardly from its outer circumferential surface and extending longitudinally thereof in an elongated spiral path, each of said fins having a width substantially equal to the spacing between the outer circumferential surface of said cylindrical section and the inner surface of said conveyor belt whereby each of said fins completely severs a piece of dough moved along the length of said cylindrical section by said conveyor belt.

2. A mandrel as recited in claim 1, in which said fins are equally spaced circumferentially of said cylindrical section.

* * * * *